(12) United States Patent
Farmine et al.

(10) Patent No.: US 6,763,225 B1
(45) Date of Patent: Jul. 13, 2004

(54) PHASE ALIGNMENT TRANSMIT DIVERSITY SYSTEM FOR RADIO COMMUNICATIONS SYSTEMS

(75) Inventors: Yann Farmine, Fonteray aux Roses (FR); Oscar Clop, Fonteray aux Roses (FR); Nicholas Whinnett, Paris (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/510,318

(22) Filed: Feb. 22, 2000

(30) Foreign Application Priority Data

May 26, 1999 (EP) .......................................... 99401258

(51) Int. Cl.[7] .............................................. H04B 17/00
(52) U.S. Cl. .................................. 455/67.16; 455/562
(58) Field of Search ............................... 455/561, 562, 455/60, 67.6, 139, 69, 67.16, 276.1, 304; 370/334, 252, 328, 329, 503

(56) References Cited

U.S. PATENT DOCUMENTS

| | | | | |
|---|---|---|---|---|
| 6,101,399 A | * | 8/2000 | Raleigh et al. | ............. 455/561 |
| 6,430,399 B1 | * | 8/2002 | Niemela | .................. 455/67.16 |

FOREIGN PATENT DOCUMENTS

| | | |
|---|---|---|
| GB | 2 313 261 A | 11/1997 |
| WO | WO 96/22662 | 7/1996 |

OTHER PUBLICATIONS

Riaz Esmailzadeh et al: "Pre–Rake Diversity Combination for Direct Sequence Spread Spectrum Communications Systems" Proceedings of the International Conference on Communications (ICCC), Us, New York, IEEE, pp. 463–467 XP000371135 ISBN: 0–7803–0950–2.

El–Khamy, Sourour, Kadous: "Wirelesss Portable Communications using Pre–Rake CDMA/TDD/QPSK Systems with Different Combining Techniques and Imperfect Channel Estimation" Proceedings of 8th International Symposium on Personal, Indoor and Mobile Radio Communications, vol. 2, Sep. 1–4, 1997, pp. 529–533, XP002122225 Helsinki, Finland.

* cited by examiner

Primary Examiner—Nay Maung
Assistant Examiner—Tu Nguyen
(74) Attorney, Agent, or Firm—Kenneth A. Haas; Steven A. May

(57) ABSTRACT

A base station (1) in a radio communication system is provided with an antenna array 2, 3 for communication with a plurality of mobile stations (4, 5). The transmissions of the base station (1) are optimised by adjusting the phase between the signals transmitted by each antenna (2, 3) so that the product of the propagation channel estimates is maximised. The invention has particular application to CDMA-TDD modes of operation where it has been shown to perform favourably in comparison with known transmit diversity techniques. A further advantage is that it does not require added complexity in the channel estimation at each mobile station (4, 5).

6 Claims, 3 Drawing Sheets

PHASE ALIGNMENT TRANSMIT DIVERSITY SYSTEM FOR RADIO COMMUNICATIONS SYSTEMS

Figure 1:
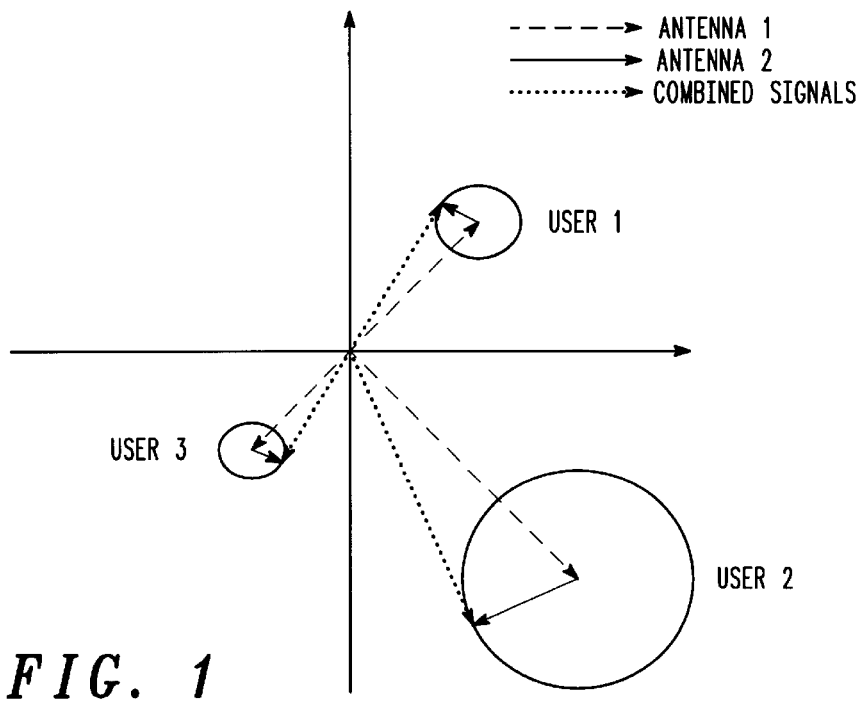

This invention relates to radio communication systems employing antenna arrays and has particular application to multi-carrier communications systems such as those employing code division multiple access (CDMA) techniques.

One type of communications system is a cellular communications system. In a cellular communications system, a plurality of base stations provides a radio communications service to a plurality of remote mobile subscriber units known as mobile stations. Each base station defines a particular geographical area or cell proximate to the base station to produce coverage areas. The communications link from the base station to a mobile station is referred to as the downlink. Conversely, the communications link from a mobile subscriber unit to the base station is referred to as the uplink.

Multiple access techniques such as CDMA, permit simultaneous transmission between several mobile stations and a single base station.

CDMA employs spread spectrum signaling whereby individual users in the communications network use the same RF carrier frequency, but are separated by the use of individual spreading codes. Hence, multiple communications channels are allocated using a plurality of spreading codes within the portion of radio spectrum, each code being uniquely assigned to a mobile station.

In some systems, one carrier frequency is allocated for communication on the downlink and another carrier frequency is allocated for communication on the uplink. This is known as FDD (frequency division duplex).

Another system uses a method known as time division duplex (TDD) in which the same carrier frequency is used for both uplink and downlink. A repeating time-frame structure is, in this case, divided into an interval with time slots used in the uplink direction and another interval with time slots used in the downlink direction.

Some systems are known which utilise knowledge of the propagation characteristics of the communication channel to adjust a characteristic of the transmission in order to achieve a more efficient use of the available resources. Most of these systems use feedback of information on the state of the link. Some systems which operate in TDD mode, use a calculated estimate of the propagation channel characteristics in one direction for adjusting a characteristic of the transmission in the other direction. Thus a base station can derive an estimate of the characteristics of the downlink propagation channel from received uplink measurements.

A base station may be fitted with single antenna or with an array of antenna elements.

Antenna arrays can provide improved performance relative to a single antenna by providing a better antenna pattern for a coverage area.

Even with an antenna array to provide an improved antenna pattern, signals communicated between the base stations and mobile stations are subject to interference. Buildings, hills and other objects produce multi-path wave propagation resulting in errors in the signals communicated.

To reduce these errors, receive and transmit diversity schemes have been developed to optimise the receive and transmit path of communications systems employing antenna arrays. By varying the weight of the signals detected by each of the individual antennas in the array, it is possible to vary the antenna pattern to better detect signals from a particular direction or to arrange for non-destructive combination of multi-path signals. These techniques adjust the weights of the antenna array signals to maximise the receive path gain by measuring the output of a receiver.

Other techniques are known whereby optimum weights are provided for the transmit path. For example, Applicants co-pending Application number GB-A-2313261 discloses a method of weighting a transmit path of a communication station A which is equipped with an antenna array. A method includes the steps of transmitting reference signals from each antenna array to a communications station B and calculating at station B weighting information based on a comparison of the incoming reference signals with stored signals. The calculated weighting information is then transmitted from station B to station A whereupon a controller in station A adjusts the antenna weights based on the received weighting information.

Transmit diversity schemes can significantly improve the downlink performance of the so-called third generation systems or UMTS (universal mobile telecommunications system) which employ CDMA techniques. However, for a CDMA system operating in time duplex mode (TDD) (where the same carrier frequency is used for both uplink and downlink), this leads to a significant increase in complexity of channel estimation at the mobile station.

The UMTS TDD mode uses TD-CDMA as multiple access technology. In this system, mobile stations and base stations use interference cancellation techniques or joint detection to decode mobile stations accessing the channel at the same time. Each user's mobile station in a cell receives the downlink signal of all the mobile stations accessing the same time slot/frequency. All this information is transmitted over the same propagation channel. Therefore, only one channel estimation is required at the mobile station.

If transmit adaptive antennas or selection transmit diversity are implemented at the base station on a per user basis, the information intended for each user is modified by a different weight. Therefore, a single mobile station (user) will receive the information in the same slot/frequency as if it had been transmitted over K different channels, K being the number of users accessing the same slot/frequency. As a consequence, the interference cancellation scheme or joint detector will require the estimation of this K different propagation channels. This will lead to a significant complexity increase of the mobile station. In fact, the channel estimation algorithm is approximately 10 times more complex.

The present invention aims to overcome this disadvantage by means of a joint optimisation criteria where the same transmission settings are applied for all mobile stations.

Accordingly, the present invention consists of a communications system including a base station for communicating with at least first and second mobile stations over respective first and second propagation channels, in which the base station includes at least first and second antennas and in which the system further includes means for deriving an estimate of the characteristics of each propagation channel, and characterised by a phase adjuster for adjusting a phase difference between communications signals transmitted by the antennas (2,3), and a control unit (9) for computing the product of the estimates, in which the phase adjuster (10) is adapted to adjust said phase difference until said product attains a maximum value.

In one embodiment, eg. TDD mode, the channel estimates are computed at the base station and derived from uplink measurements received from each mobile station.

In an alternative embodiment, eg.FDD mode, the channel estimates are computed at each mobile station and fed back to the base station.

If all the users are optimised at the same time (i.e. the phase alignment transmit diversity scheme offered by the present invention is used and in addition, only one weight is applied at the transmitter), a single mobile station will see the received information as if it has been transmitted over a single propagation channel (i.e the real channel multiplied by the applied weight). Therefore, independently of the number of users, only one channel will have to be estimated and the implementation of transmit diversity at a base station will not increase the complexity at a mobile station.

Figure 2:
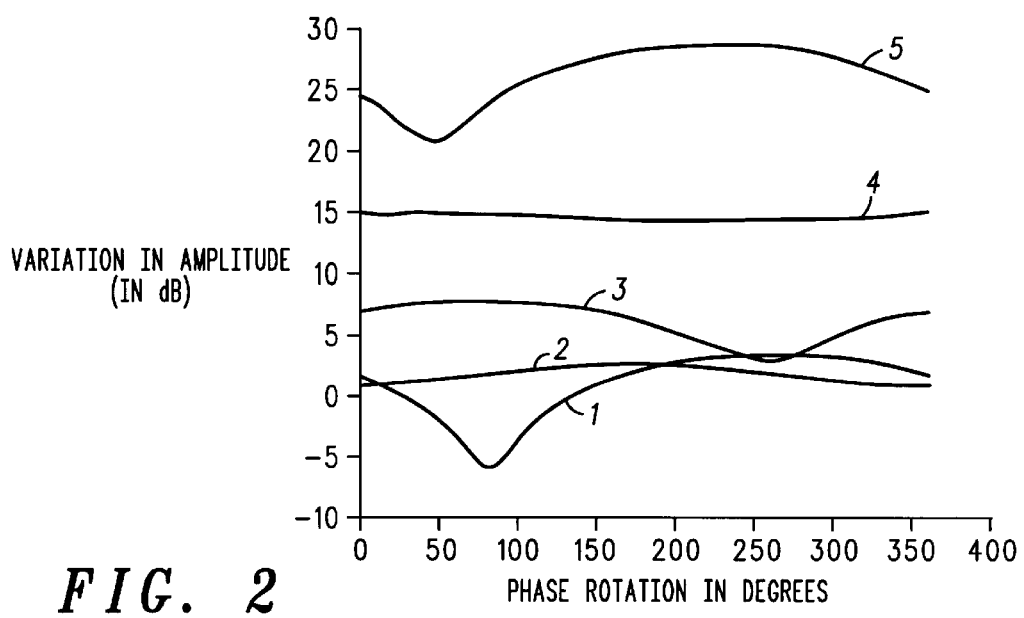
Figure 3:
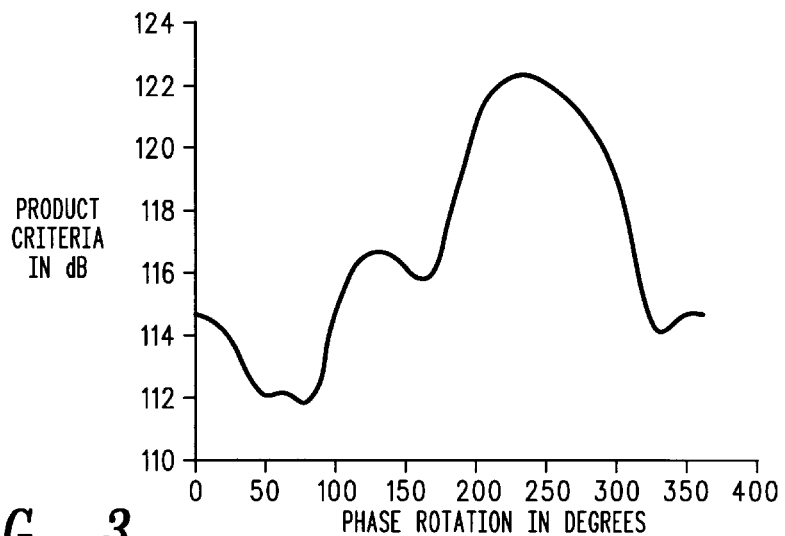
Figure 4:
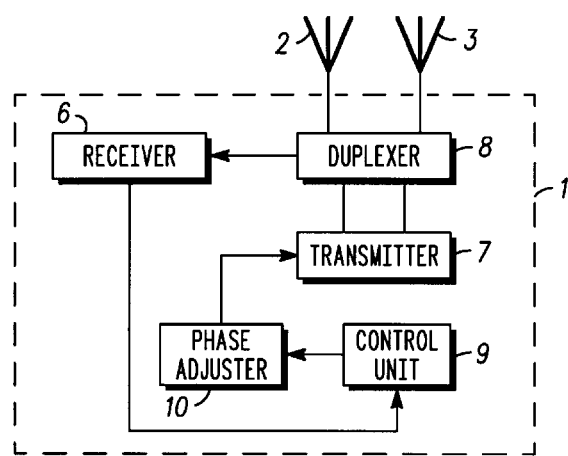
Figure 4:
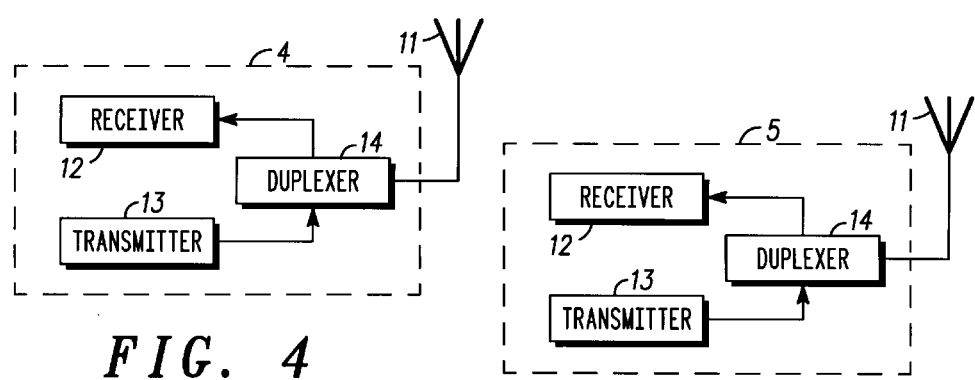
Figure 5:
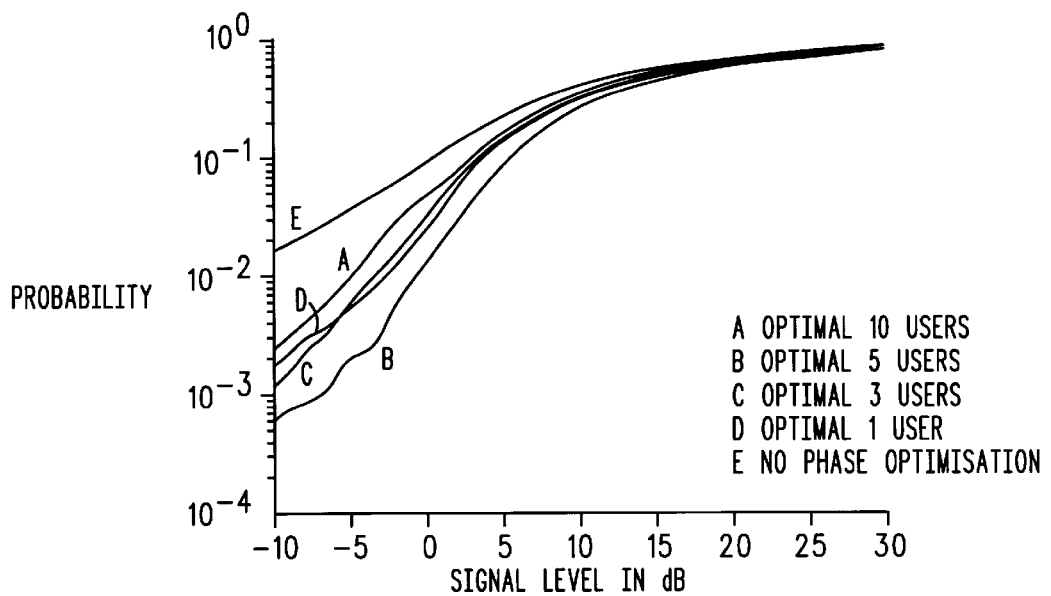
Figure 6:
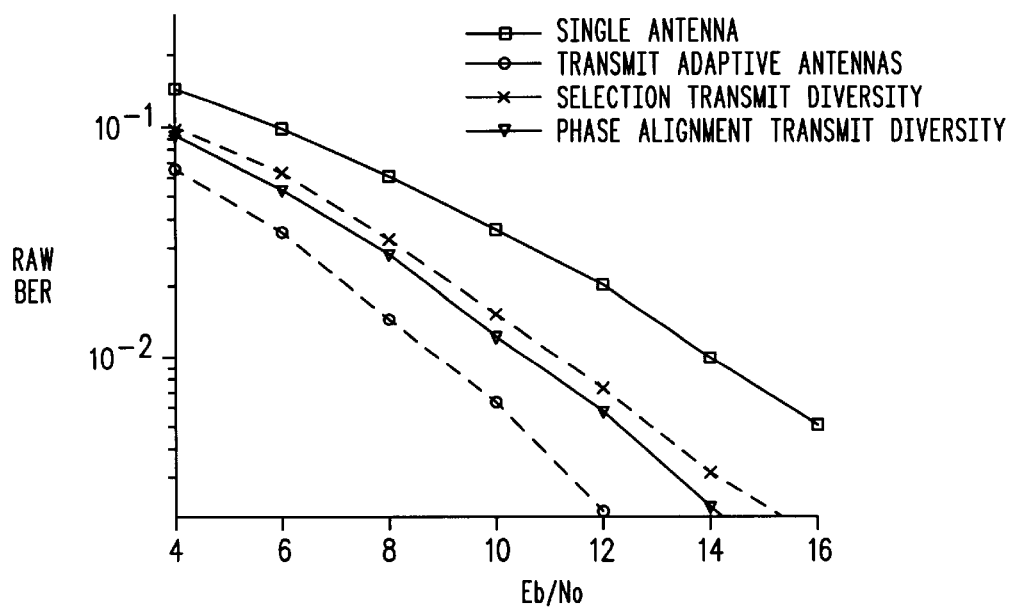

Some embodiments of the invention will now be described by way of example only with reference to the drawings of which;

FIG. 1 is a plot showing signal vectors received by three users from a single base station having two antennas, FIG. 2 is a graph of phase rotation versus amplitude variation for different mobile stations, FIG. 3 is a graph of phase rotation versus a product criterion for received signals at a plurality of mobile stations, FIG. 4 is a block diagram of a radio communication system in accordance with the invention, FIG. 5 is a graph showing a cumulative probability distribution function for a plurality of mobile stations, and FIG. 6 is a graph comparing the performance of the invention with known systems.

With reference to FIG. 1, consider the case where a TDD system is broadcasting a downlink signal using an antenna array of two elements. Each user experiences a different channel from each of the antennas and furthermore these channels are independent between the users. Each of the channels could be considered ideally as an uncorrelated complex co-efficient (Rayleigh distributed amplitudes and uniformly distributed phases) for now the channel is considered to be flat (i.e. single tap model).

As shown in FIG. 1, combining the signals coming from the two antennas results in a third vector. However, if the phase of the transmitted signal in one antenna is rotated, this third vector follows the plotted circle. Moreover, the variation of the circle will be at the same rate for all the users but will not commence at the same starting point (which corresponds to the initial phase of the channel for each antenna). The problem consists of the following: How can the system be optimised for all the users at the same time? The intuitive answer is to rotate the phase of one of the transmitting antennas and find one phase that maximises the signal for all the users.

Obviously, the optimum phase taken individually is not optimum for the others. A second question arises as follows: Is a useful gain still obtained by adjusting the phase in this way, even if it is sub-optimal individually? Finally, a third question is; what should the criterion be in order to implement such a scheme?

A mathematical derivation helps to answer those questions as follows:

Consider two transmit antennas and N users as a first step. For user 1, the two received signal can be represented by two complex numbers: a and b. The received power if the phase of one of the antenna is swept can be written:

$$R(\Phi)=|a.\exp(j\Phi)+b|^2=|a|^2+|b|^2+a.b^*.\exp(j\Phi)+a^*.b.\exp(-j\Phi)$$

Where a is the complex coefficient corresponding to the propagation channel between the first antenna (whose phase is swept) and user 1, and b is the complex coefficient corresponding to the propagation channel between the second antenna and user 1.

The first two terms are independent of $\Phi$ and we can define a new quantity $$P(\Phi)=z+z^* \text{ where } z=a.b^*.\exp(j\Phi)$$

$$\text{therefore } P(\Phi)=2*Re(z)=2|z|Re(\exp(j(\Phi+\phi)))=2|z|*\cos(\Phi+\phi)$$

where $\phi$ is the initial phase of the channel.

Now, we can answer the second question by choosing a criterion based on the product of the powers defined as:

$$P(\Phi)=|z1|\ldots|zN|*\cos(\Phi+\phi 1)*\cos(\Phi+\phi 2)*\ldots*\cos(\Phi+\phi N)$$

Intuitively, we can expect from the above that in some cases, when one of the components has a small amplitude then the phase variation will have not have much impact on the resultant vector. However, it can be seen that its impact on the criterion is negligible as it will not contribute to the variation to the criterion.

One can see the zi as the weight of each cosine function. This has an important impact on the robustness of the process as it can accommodate variation in the signal amplitude without the need for more complex process control.

To the first question, is there an optimum, we can first answer to the case where there are two users and then extend to more than two users:

For 2 users the optimum point is found when from differentiating $P(\Phi)$ which gives:

$$\tan(\Phi+\phi 1)=-\tan(\Phi+\phi 2)$$

this maximum always exists and is unique. When this is extended to more than two users it is a bit more involved mathematically speaking but it can be shown that statistically it is verified.

FIG. 2 shows the amplitude variation of each user in db when the phase is rotated for a give random scenario. Ten users were considered and five of them are represented. User 2 can gain from 2 to 2.5 db when the phase is roughly between 0° and 150°. The impact on user 4 is neglible. Note that user 5 signal strength range is around 7 db depending on the phase adjusted.

FIG. 3 shows that a phase equal to 230° maximises the product criterion for the ten user case.

Referring now to FIG. 4, a base station 1 is provided with two antennas 2, 3 and communicates with each of two mobile stations 4 and 5. The base station 1 further includes a receiver 6 and a transmitter 7 for receiving and transmitting signals via the antennas 2 and 3 and via a duplexer 8 also incorporated in the base station 1. Further, there is provided in the base station 1 a control unit 9 having an input connected to an output of the receiver 6 and having an output connected to a phase adjuster 10. An output of the phase adjuster 10 is connected to the transmitter 7.

Each mobile station 4, 5 comprises an antenna 11 for transmitting and receiving signals from the base station 1, and a receiver 12 and a transmitter 13, each connected to the antenna 11 via a duplexer 14.

In operation, the base station 1 communicates with each mobile station 4, 5 via the two antennas 2, 3 in a TDD mode. In accordance with known techniques, the receiver 6 computes the channel estimates appropriate for each mobile station 4,5 derived from uplink measurements. These estimates are fed to the control unit 9 which computes their product.

Initially, the phase between the signals transmitted is set by the phase adjuster 10 to some arbitrary value. Subsequently, the phase adjuster 10 commences to sweep the phase difference of the antennas 2, 3 outputs as the control unit 9 continually computes and tracks the value of the product of the channel estimates until it detects a maximum. It then signals to the phase adjuster circuit 10 to curtail the sweeping process and to set the phase difference at the point where the maximum computed product value is attained.

FIG. 5 shows the CDF (cumulative distribution function) of the received power as the number of optimised users increases. Note that for one user this scheme is equivalent to transmit adaptive antennas using only a phase adjustment criterion. When the number of users increases, there is still a significant gain when compared with the single antenna case.

For the case having many uses to be jointly optimised, only some users may be selected for application of the criterion. These could be high priority users. Also, those users with very good signal to noise ratio conditions could be left out as they do not need the extra gain provided by the invention.

FIG. 6 compares the performance of transmit adaptive antennas, selection transmit diversity and phase alignment transmit diversity in accordance with the invention for a UMTS TDD mode. This mode is a broadband system where chip rate is high enough to resolve multiple channel paths. Therefore, in this case phase alignment transmit diversity can be applied to jointly maximise the energy received on the strongest path for each user.

In the specific case of FIG. 6, the chosen scenario is an indoor channel with four users accessing the same time slot/frequency and a MMSE joint detector being used in the mobile station. Results show that the invention performs 3.5 db better than a single antenna, 0.5 db better than selection transmit diversity and only 2 db worse than the transmit adaptive antenna which is the optimum. As previously stated, the advantage of the invention over the known techniques is that it does not need multiple channel estimations at the mobile station thereby leading to significantly less complex mobile stations.

The invention has many other applications in the communications field. For example, those skilled in the art will recognise that it can be implemented during a soft hand-off. The soft hand-off case is straightforward when one considers that on the uplink a user is broadcasting a message to two base stations. The invention can also be used in conjunction with broadcast channels. It can be used in cases of multi-path optimisation with FIR pre-distortion filter. In this case not only the strongest path is optimised, but a number determined by the length by the FIR filter.

The invention also has application to PMR TDMA system which implement group/broadcast call where the same information is transmitted to many different users which need to be jointly optimised.

It may also be used for interference reduction in CDMA systems using transmit adaptive antennas. Considering interference in a cell, one can view the system as a dedicated channel for one user which impacts as a broadcast interferer to the others. Thus, the transmit adaptive antenna weights of this user can be slightly modified using the invention to reduce the interference caused to the others.

We claim:

1. A communications system including a base station for communicating with a first mobile stations over a first propagation channels and with at least a second mobile station over a second propagation channel, in which the base station includes at least first and second antennas, and in which the system further includes means for deriving a first estimates of the characteristics of said first propagation channels and a second estimate of the characteristics of said second propagation channel, said base station including:

a phase adjuster for adjusting a phase difference between communications signals transmitted by the antennas, and a control unit for computing the product of said first and second estimates multiplied by each other, in which the phase adjuster is responsive to said product to adjust said phase difference for the propagation channels to all said mobile stations until said product attains a maximum value.

2. A method of achieving transmit diversity in a communications system including a base station provided with at with at least two antennas and communicating with a first mobile stations over a first propagation channels and with at least a second mobile station over a second propagation channel, the method including the steps of;

deriving a first estimates of the characteristics of said first propagation channels and a second estimate of the characteristics of said second propagation channel, and, at the base station:

computing the product of said first and second estimates multiplied by each other, and adjusting the phase difference between communication signals transmitted by each antenna until said product attains a maximum value.

3. A communications system as claimed in claim 1, for communicating with said mobile stations in Time Division Duplex mode, wherein the channel estimates used to compute said product are computed at the base station and derived from uplink measurements received from each mobile station.

4. A communications system as claimed in claim 1, for communicating with said mobile stations in Frequency Division Duplex mode, wherein the channel estimates used to compute said product are computed at each mobile station and fed back to the base station.

5. A method as claimed in claim 2 of achieving transmit diversity in a communications system communicating with said mobile stations in Time Division Duplex mode, wherein the channel estimates used to compute said product are computed at the base station and derived from uplink measurements received from each mobile station.

6. A method as claimed in claim 2 of achieving transmit diversity in a communications system communicating with said mobile stations in Frequency Division Duplex mode, wherein the channel estimates used to compute said product are computed at each mobile station and fed back to the base station.

* * * * *